United States Patent [19]

Mason

[11] 3,837,600
[45] Sept. 24, 1974

[54] VERTICAL TAKE-OFF AND LANDING AIRPLANE

[76] Inventor: Ralph S. Mason, Rt. No. 1 Box 75, Proctor, W. Va. 26055

[22] Filed: May 21, 1973

[21] Appl. No.: 362,309

[52] U.S. Cl............................................. 244/12 R
[51] Int. Cl........................................... B64c 29/04
[58] Field of Search........... 244/2, 12, 13, 23, 34 A, 244/42 CC, 51, 53 R, 54, 55, 56

[56] References Cited
UNITED STATES PATENTS

| | | | |
|---|---|---|---|
| 1,824,250 | 9/1931 | Wells | 244/12 D |
| 2,961,189 | 11/1960 | Doak | 244/56 |
| 3,139,245 | 6/1964 | Frey | 244/12 B |
| 3,222,012 | 12/1965 | Piasecki | 244/51 |
| 3,260,482 | 7/1966 | Stroukoff | 244/51 |
| 3,312,426 | 4/1967 | Fowler | 244/12 D |

*Primary Examiner*—Duane A. Reger
*Assistant Examiner*—Jesus D. Sotelo

[57] ABSTRACT

An aircraft capable of flying in any direction by means of driven propellers, housing turbulence eliminators, wings and ailerons supported on the front and middle sides of an airplane frame and controlled for simultaneous pivoting in a direction longitudinally of said airplane frame together with driven propellers, housing, turbulence eliminators, rudders and elevators pivotally mounted and controlled at the sides of the tail end of said airplane frame.

8 Claims, 6 Drawing Figures

VERTICAL TAKE-OFF AND LANDING AIRPLANE

The present invention is concerned with an airplane capable of vertical lift-off or landing together with horizontal flight.

The principal object of the present invention is to provide an airplane which can take-off or land in a vertical or substantially vertical direction and by controlling side propulsion units can be flown in any direction as desired.

Further objects of the invention will be in part obvious and in part pointed out in the following detailed description of the accompanying drawings in which, FIG. 1 is a top view of the present airplane FIG. 2 is a cross-sectional view taken on line 2—2 of FIG. 1.

Figure 1:
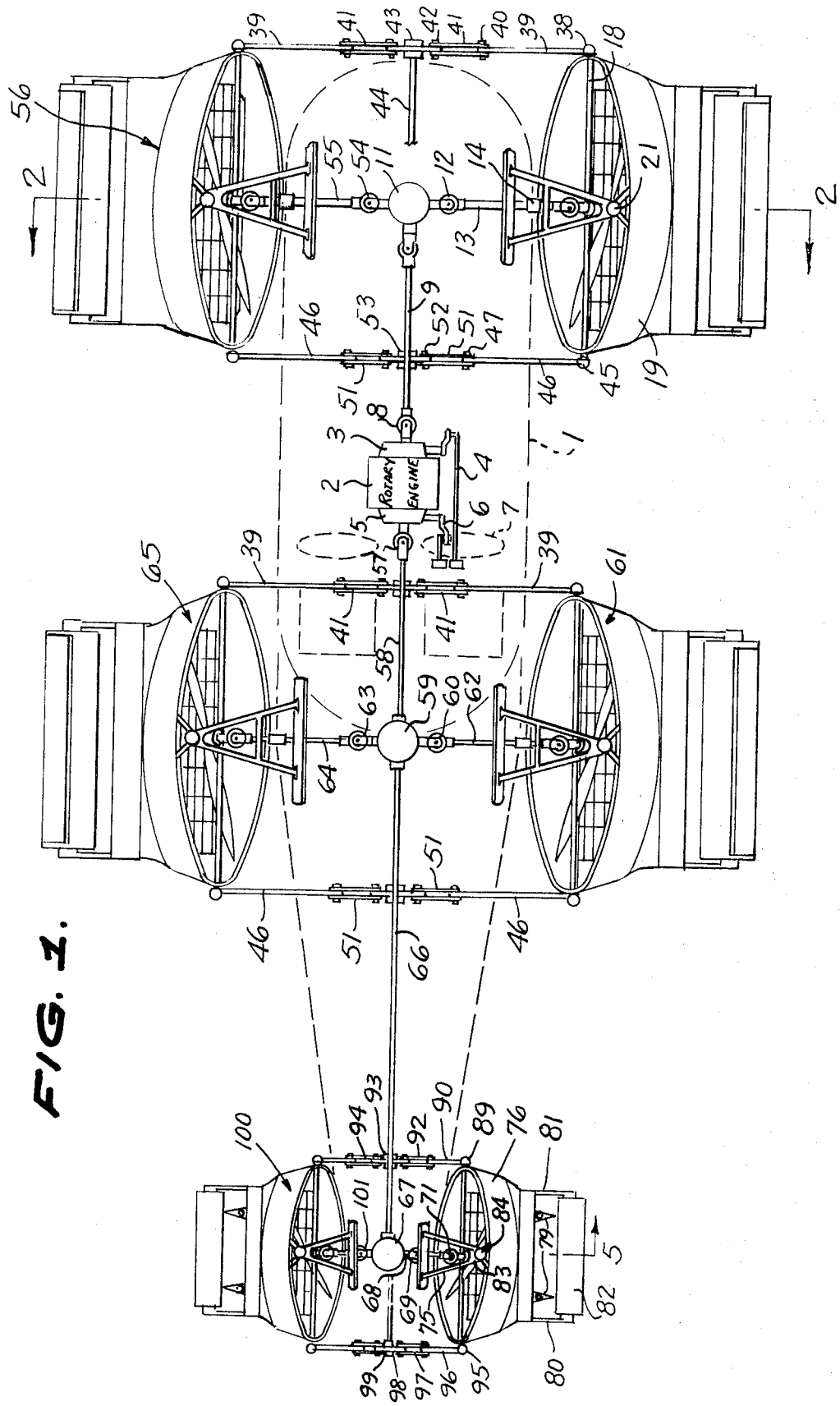

Referring now more particularly to the accompanying drawings in which like and corresponding elements are referred to by similar reference characters, numeral 1 indicates an airplane fuselage with landing gear 1a, supporting an engine 2 of the turbine type or internal combustion type such as the Wankel type. A clutch 3 is connected to said engine and controlled by foot pedal linkage 4 by an operator. A second clutch 5 is also attached to said engine to be controlled by foot pedal linkage 6. A steering wheel is indicated at 7.

A universal joint 8 is connected to clutch 3 and shaft 9 while said shaft 9 is connected by universal joint 10 to a bevel gear 11a in gear box 11. Said bevel gear meshes with bevel gears 12a and 54a as shown in FIG. 2.

Bevel gear 12a is connected to universal joint 12 which is connected to shaft 13 rotatably supported in bearing 14 mounted on fuselage 1. Universal joint 15 is connected to shaft 13 and propeller 19 and said propeller is rotatably supported by its shaft extending through hub 16.

Hub 16 is supported by radial rods 17 and 18 connected at their outer ends to an annular housing 20. Said housing 20 has V-shaped lugs 21 and 25 at the top and bottom, respectively, of said housing. A ball joint 22 connects lug 21 with V-frame 23 whose base 24 is attached to fuselage 1. Similarly lug 25 is connected by ball joint 26 to V-frame 27 whose base 28 is also attached to said fuselage 1.

Figure 2:
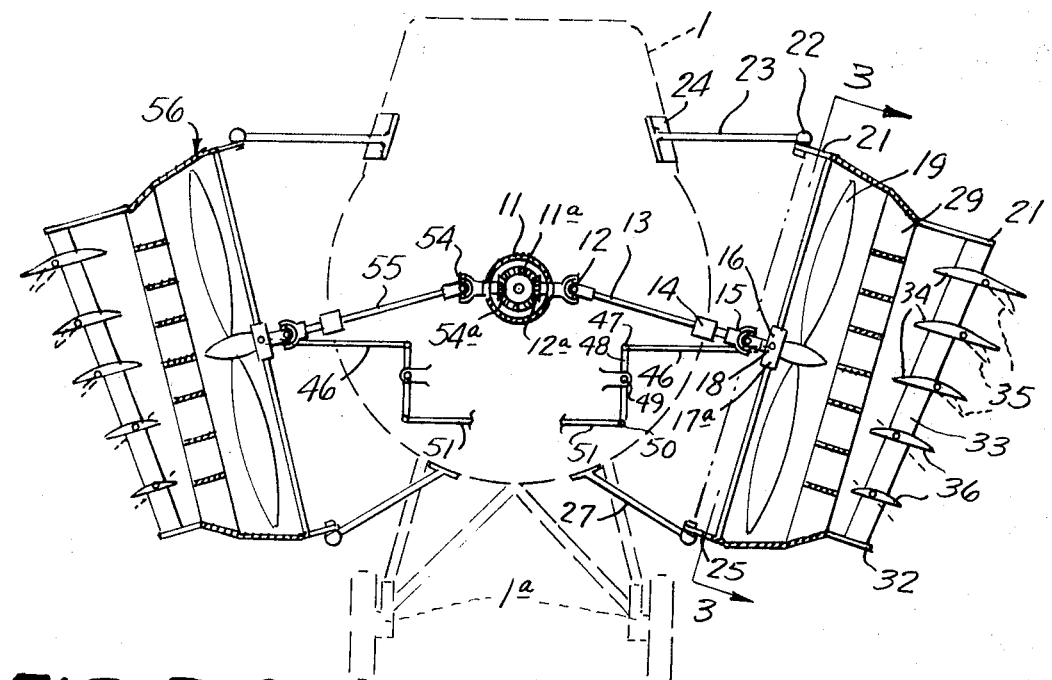
Figure 3:
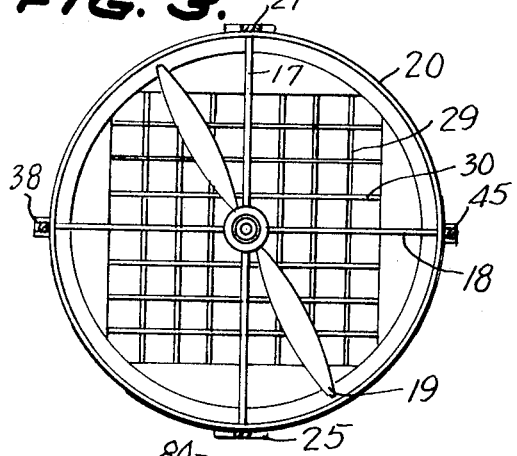
FIG. 3 is a sectional view taken on line 3—3 of FIG. 2.

Housing 20 is square shaped at the air exit end or right hand end portion thereof as viewed in FIG. 2 and contains fins 29 and 30 extending thereacross performing as air turbulence eliminators.

Figure 4:
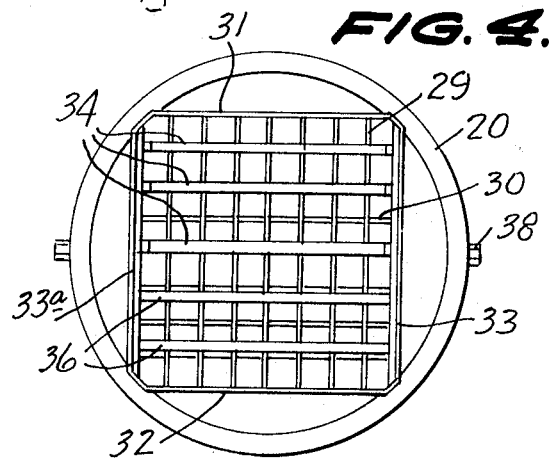
FIG. 4 is a side view of the right hand front propulsion unit
Figure 5:
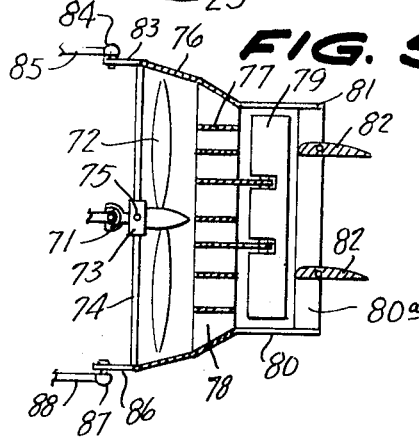
FIG. 5 is a cross-sectional view taken on line 5—5 of FIG. 1.
Figure 6:
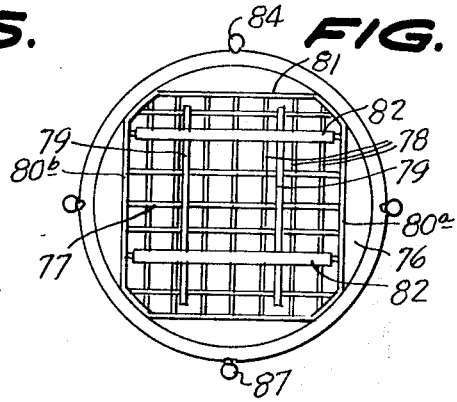
FIG. 6 is an end view taken from the right hand end of FIG. 5.

Plate extensions 31 and 32 extend from the top and bottom of said square end of housing 2 and are connected by uprights 33 and 33a forming a square frame as shown in FIG. 4. Airfoils 34 are fixedly connected to and extend between uprights 33 and 33a and have ailerons 35 pivotally connected thereto. Flaps 36 are also pivotally attached to uprights 33 and 33a with airfoils 34 and flaps 36 offset relative to one another as shown in FIG. 2 for better lift. Conventional means for operating ailerons 35 and flaps 36 are not shown.

A ball joint 38 is attached to the forward end of rod 18 and to link 39. A pivotally mounted arm 40 is pivotally connected at one end to link 39 and at its opposite end to link 41. Link 41 is pivotally connected at 42 to one side of hub 43 of shaft 44.

The other end of rod 18 has a ball joint 45 connected to link 46 with link 46 pivotally connected at 47 to one end of arm 48. Arm 48 is pivotally supported at 49 and pivotally connected at 50 to link 51. Link 51 is pivotally connected to hub 53 fixedly mounted on shaft 44 with link 51 on an opposite side of hub 53 relative to the connection of link 41 on hub 43.

The airfoils 34 are fixedly connected to uprights 33 and 33a and tilt down about seven degrees from a right angle to the fins 30 and fins 29 and 30 form six inch squares therebetween.

The above described propulsion unit 12–52 is also an example of the propulsion units 56, 61 and 65 and while all four units are the same the description of unit 12–52 applies to each of the units 56, 61 and 65 and therefore is not herein repeated.

Unit 56 is also positioned at the front end of fuselage 1 opposite unit 12–52 and has propeller shaft 55 connected by universal joint 54 to bevel gear 54a in gear box 11.

Units 61 and 65 are on opposite medial sides of fuselage 1.

Clutch 5 is connected by universal joint 57 to shaft 58. A four way gear box 59 contains four meshing bevel gears (not shown) with shaft 58 connected to one of said bevel gears in box 59. A universal joint 60 is connected to a second bevel gear in box 59 and to propeller shaft 62 of unit 61. Universal joint 63 is connected to a third bevel gear in box 59 and to propeller shaft 64 of unit 65.

A drive shaft 66 is connected to the fourth bevel gear in box 59.

Shaft 66 is connected to a bevel gear (not shown) in three-way gear box 67 which also contains two other bevel gears (not shown) meshing with the first mentioned bevel gear therein. Shaft 68 is connected to one of the other two bevel gears and to universal joint 69. A shaft connects universal joint 69 to universal joint 71. A propeller 72 has its shaft rotatably mounted in hub 73 and is connected to universal joint 71.

Radial rods 74 and 75 support hub 73 at their centers and have their outer ends connected to annular housing 76. Said housing 76 has a square air exit end portion housing fins 77 and 78 extending thereacross.

A pair of rudders 79 are pivotally connected to some of said fins 77 within extensions 80 and 81 extending from housing 76. Uprights 80a and 80b are connected to and extend between extensions 80 and 81 forming a square frame.

Elevators 82 extend between and are pivotally connected to uprights 80a and 80b. Conventional means (not shown) control the pivoting of said rudders 79 and elevators 82.

Housing 76 has top and bottom V-lugs 83 and 86 with lug 83 connected to ball joint 84 which is connected to V-frame 85 whose base is connected to fusilage 1. Lug 86 is connected by ball joint 87 to V-frame 88 whose base is also connected to fuselage 1.

Housing 76 has a side ball joint 89 connected by link 90 to one end of a pivotally mounted lever 91 with the other end of lever 91 pivotally connected at 93 by link 92 to a hub 94 fixedly mounted on shaft 44. A second ball joint 95 is mounted on the opposite side of housing 76 and pivotally connected by link 96 to one end of a pivotally mounted lever 97 whose other end is pivotally connected to link 98 which in turn is pivotally connected to hub 99 fixedly mounted on shaft 44. Link 98 is connected to an opposite side of hub 99 to the connection of link 92 to hub 94.

Unit 100 is the same as unit 68–99 and is connected to a third of the bevel gears in gear box 67 by shaft 101.

A propeller could be mounted on shaft 9 at the front of fuselage 1 and shaft 9 connected to a further bevel gear (not shown) in box 11 for obtaining faster forward speed for the airplane. Also the normal airplane wings (not shown) could be connected to and extend laterally from fuselage 1.

In the operation of the present airplane, engine 2 is started while disengaging both clutches 3 and 5 and then each clutch is engaged rotating propellers 17 of units 12–52, 56, 61 and 65 and also propellers 72 of units 68–92 and 100.

All ailerons 35 and flaps 36 of units 12–52, 56, 61 and 65 are connected together by conventional means such as cables and control pedal or stick (not shown) to be operated by the pilot. Also rudders 79 and elevators 82 of units 68–92 and 100 are connected by conventional controls such as cables (not shown) to control wheel 7 to also be operated by the pilot.

Shaft 44 has a control member (not shown) whereby the pilot can rotate shaft 44 as desired whereby all units 12–52, 56, 61, 65, 68–92 and 100 can be pivoted forward or backward longitudinally of fuselage 1 as desired. By adjusting the speed of motor 2 and the position of shaft 44 the propulsion units will impart a forward or backward movement to the airplane as well as giving lift to the airplane or permitting the same to move downwardly as for a landing.

Control members are not shown in the drawings so that the novel structure can be readily viewed and understood.

I claim:

1. An airplane comprising a fuselage, an engine mounted in said fusilage, a plurality of hollow propeller housings pivotally mounted along opposite sides of and at forward, medial and rear portions of said fuselage with the axis of each of said housings extending on a downward slant relative to said fuselage, propellers rotatably mounted in said housings, means operatively connecting said propellers to said engine, means for pivoting said housings longitudinally of said fuselage, air turbulance eliminator means mounted in said housings at the exhaust side of said propellers, airfoils connected to those of said housings located at the medial and forward portions of said fuselage, elevators pivotally connected to the ones of said housings at the rear portion of said fuselage, rudders also pivotally connected to said ones of said housings, means for controlling said elevators and rudders, said housings each having an annular portion surrounding the propeller therein and a square portion at the exhaust side of said propeller, said air turbulance eliminator means each comprising fins extending across each of housing square portions forming square openings therebwteen for the passage of air from its propeller.

2. An airplane as claimed in claim 1 wherein extensions are connected to and extend from each of said housings squared portion air exhaust ends, said forward and medial housings have said airfoils connected to said extensions, and said rear housings have said elevators and rudders pivotally connected to their extensions.

3. An airplane as claimed in claim 2 wherein said airfoils are offset relative to one another, some of said airfoils have ailerons pivotally connected thereto and others of said airfoils are pivotally connected at their ends to some of said extensions.

4. An airplane as claimed in claim 1 wherein radial rods extend across and are connected to each of said housings, a bearing is supported by said rods and said propeller is rotatably supported by said bearing.

5. An airplane as claimed in claim 4 wherein ball joints are each connected to the top and bottom of said housings, and frames connected to said fusilage are also connected to said ball joints providing the pivotal mountings of said housings.

6. An airplane as claimed in claim 5 wherein further ball joints are each connected to the sides of each housing, a controllable rotatably shaft extends lengthwise of said fusilage and means operatively connecting said shaft with said further ball joints of all of said housings for pivoting said housings together longitudinally of said fuselage.

7. An airplane as claimed in claim 6 wherein said operative means each comprises a link pivotally connected to one of said further ball joints, a lever pivotally mounted on said fuselage and having said link pivotally connected to one end of said lever, a second link pivotally connected to the other end of said lever, and a hub fixedly mounted on said rotatably shaft and pivotally connected to said second link.

8. An airplane as claimed in claim 1 wherein said operative means comprises gear boxes, clutches connected to said engine, ball joints operatively connected to said clutches and said gear boxes and shafts connected to said universal joints providing flexible connections between said engine and each of said propellers.

* * * * *